(12) United States Patent
Zheng et al.

(10) Patent No.: US 11,941,347 B2
(45) Date of Patent: Mar. 26, 2024

(54) CLAUSE CONTROL IN SYNCHRONOUS MULTI-PARTY EDITING SYSTEM

(71) Applicant: DocuSign, Inc., San Francisco, CA (US)

(72) Inventors: Yiting Zheng, Chicago, IL (US); Phillip Stewart, Chicago, IL (US); Deepinder Badesha, Union City, CA (US); Kocheng Hsiang, San Francisco, CA (US); Iqra Anjum, San Francisco, CA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

(21) Appl. No.: 17/856,128

(22) Filed: Jul. 1, 2022

(65) Prior Publication Data
US 2024/0005086 A1    Jan. 4, 2024

(51) Int. Cl.
*G06F 16/93*    (2019.01)
*G06F 40/106*    (2020.01)
*G06F 40/166*    (2020.01)
*G06Q 10/101*    (2023.01)

(52) U.S. Cl.
CPC ............ *G06F 40/166* (2020.01); *G06F 16/93* (2019.01); *G06F 40/106* (2020.01); *G06Q 10/101* (2013.01)

(58) Field of Classification Search
CPC ...... G06F 40/106; G06F 40/166; G06F 16/93; G06Q 10/101
See application file for complete search history.

(56) References Cited

U.S. PATENT DOCUMENTS

| | | | | |
|---|---|---|---|---|
| 2002/0065848 A1* | 5/2002 | Walker | ............. | G06F 21/6209 |
| | | | | 715/255 |
| 2002/0129056 A1* | 9/2002 | Conant | ............. | G06Q 30/06 |
| | | | | 715/255 |

(Continued)

FOREIGN PATENT DOCUMENTS

| | | | | |
|---|---|---|---|---|
| CA | 2616956 A1 * | 2/2007 | ............. | G06F 17/24 |
| WO | WO-0217115 A2 * | 2/2002 | ............. | G06F 17/24 |
| WO | 2021164545 A1 | 8/2021 | | |

OTHER PUBLICATIONS

International Search Report and Written Opinion of International Application No. PCT/US2023/069084 dated Sep. 25, 2023, 19 pp.

*Primary Examiner* — Shahid K Khan
(74) *Attorney, Agent, or Firm* — Shumaker & Sieffert, P.A.

(57) ABSTRACT

An online document system enables simultaneous collaboration on a shared document. Users associated with two or more collaborating entities can see edits and comments made to the shared document from all participants in real time. A first entity chooses to make all edits public to everyone or temporarily locks a clause so that the real time edits to the clause are only visible to users associated with the first entity. This allows all users associated with the first entity to continue to collaborate among themselves on edits to the locked document until it is in a state where they are ready for the rest of the users associated with other entities to view the changes. At the same time, the other users can continue to review, edit, and collaborate on the other clauses in the document. When the permissions are updated, all entities can again view the clauses for negotiation.

20 Claims, 6 Drawing Sheets

(56) References Cited

U.S. PATENT DOCUMENTS

| | | | |
|---|---|---|---|
| 2004/0139327 A1* | 7/2004 | Brown | G06F 21/34 |
| | | | 713/176 |
| 2006/0101321 A1* | 5/2006 | Friedrichowitz | G06F 40/174 |
| | | | 715/255 |
| 2009/0006936 A1* | 1/2009 | Parker | H04L 12/1813 |
| | | | 715/200 |
| 2009/0116076 A1* | 5/2009 | Nagano | H04N 1/00477 |
| | | | 358/403 |
| 2009/0327294 A1* | 12/2009 | Bailor | G06F 40/166 |
| | | | 707/999.009 |
| 2013/0055074 A1* | 2/2013 | Trese | G06F 16/9577 |
| | | | 715/255 |
| 2013/0212151 A1* | 8/2013 | Herbach | H04L 67/1095 |
| | | | 709/203 |
| 2014/0164255 A1* | 6/2014 | Daly | G06Q 10/0631 |
| | | | 705/80 |
| 2016/0224764 A1* | 8/2016 | Pathak | G06F 21/10 |
| 2017/0076101 A1 | 3/2017 | Kochhar et al. | |
| 2017/0287090 A1* | 10/2017 | Hunn | H04L 63/12 |
| 2017/0346828 A1* | 11/2017 | Lorensson | G06F 16/93 |
| 2018/0300304 A1* | 10/2018 | Mullins | G06Q 10/10 |
| 2019/0370749 A1 | 12/2019 | Milvaney et al. | |
| 2020/0117849 A1* | 4/2020 | Smith | H04L 63/101 |
| 2020/0193082 A1* | 6/2020 | Lorensson | G06F 21/62 |
| 2022/0138160 A1 | 5/2022 | Anjum et al. | |
| 2022/0391528 A1 | 12/2022 | Zhang et al. | |

* cited by examiner

CLAUSE CONTROL IN SYNCHRONOUS MULTI-PARTY EDITING SYSTEM

BACKGROUND

This disclosure relates generally to document negotiation, and more specifically to an online document system and interface to facilitate synchronous multi-party negotiations of document contents.

Reaching agreement on a contract, sale terms, or other document agreed on between two or more entities (such as companies, individuals, groups, or the like) can involve prolonged negotiations over the exact terms of the contract or other contents of the document. A negotiation between two entities can be an extended process involving multiple rounds of edits and versions from all sides. Existing systems for managing negotiation documents often rely on users uploading and reuploading various proposed versions of the negotiated document to a central repository (which can then be downloaded by the other side and changed/critiqued).

However, the manual upload and editing process used by many existing systems (having individual users download and independently work on the documents) can leave open multiple avenues for user mistakes that can interrupt the negotiation process. For example, a user can upload the wrong documents (for example an internal version or previous version of the document), a user can become confused with the system when uploading and downloading document versions (as much of the activity happens in the document editing software outside of the system itself), or other similar problems can occur which can cause delays and unnecessary confusion in the negotiation process. Furthermore, the upload and download process for reviewing documents prevents useful communication and collaboration between parties that can take place at a negotiation performed in person.

SUMMARY

An online document system provides a platform for collaborating on a shared document in real time. A shared document is generated by the online document system based, for example, on a request from a creating user. The shared document includes a plurality of clauses and is simultaneously accessible by a first set of entities and a second set of entities. The online document system modifies a first access permission associated with a first clause in the shared document. The first access permission limits viewing and editing permissions of the first clause to the first set of entities. The online document system modifies a second access permission associated with a second clause of the shared document. The second access permission limits viewing and editing permissions of the second clause to the second set of entities.

The online document system modifies a first display of the shared document via a first device of the set of entities and also modifies a second display of the shared document via a second device of the second set of entities. The modifications are made such that the first clause is visible to users of devices associated with the first set of entities and not visible to users of devices associated with the second set of entities. Simultaneously, the modifications are made such that the second clause is not visible to users of devices associated with the first set of entities and is visible to users of devices associated with the second set of entities. The remainder of the shared document is simultaneously visible to both the first set of entities and the second set of entities on both the first devices and the second devices.

In response to the first access permission being modified to provide viewing and editing permissions of the first clause to the second set of entities, the online document system modifies the second display of the shared document via the second device such that the first clause is visible to the second set of entities on the second device. In response to the second access permission being modified to provide viewing and editing permissions of the second clause to the first set of entities, the online document system modifies the first display of the shared document via the first device such that the second clause is visible to the first set of entities on the first device.

A letter after a reference number, such as "110A," indicates that the text refers specifically to the element having that particular reference numeral, while a reference numeral in the text without a following letter, such as "110," refers to any or all of the elements in the figures bearing that reference numeral.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

An online document system can facilitate the creation, negotiation, and management of documents by one or more users of the online document system. For example, the online documents system can allow users to create, edit, review, and negotiate document clauses with other users. In some implementations, documents created using the online document system are split into clauses or sections which can be independently modified or negotiated by users of the online document system.

The online document system enables simultaneous collaboration on a shared document. Users associated with two or more collaborating entities can see edits and comments made to the shared document from all participants in real time. A first entity chooses to make all edits public to everyone or temporarily locks a clause so that the real time edits to the clause are only visible to users associated with the first entity. This allows all users associated with the first entity to continue to collaborate among themselves on edits to the locked document until it is in a state where they are ready for the rest of the users associated with other entities to view the changes. At the same time, the other users can continue to review, edit, and collaborate on the other clauses in the document. When the permissions are updated, all entities can again view the clauses for negotiation.

Online Document System Architecture

Figure 1:
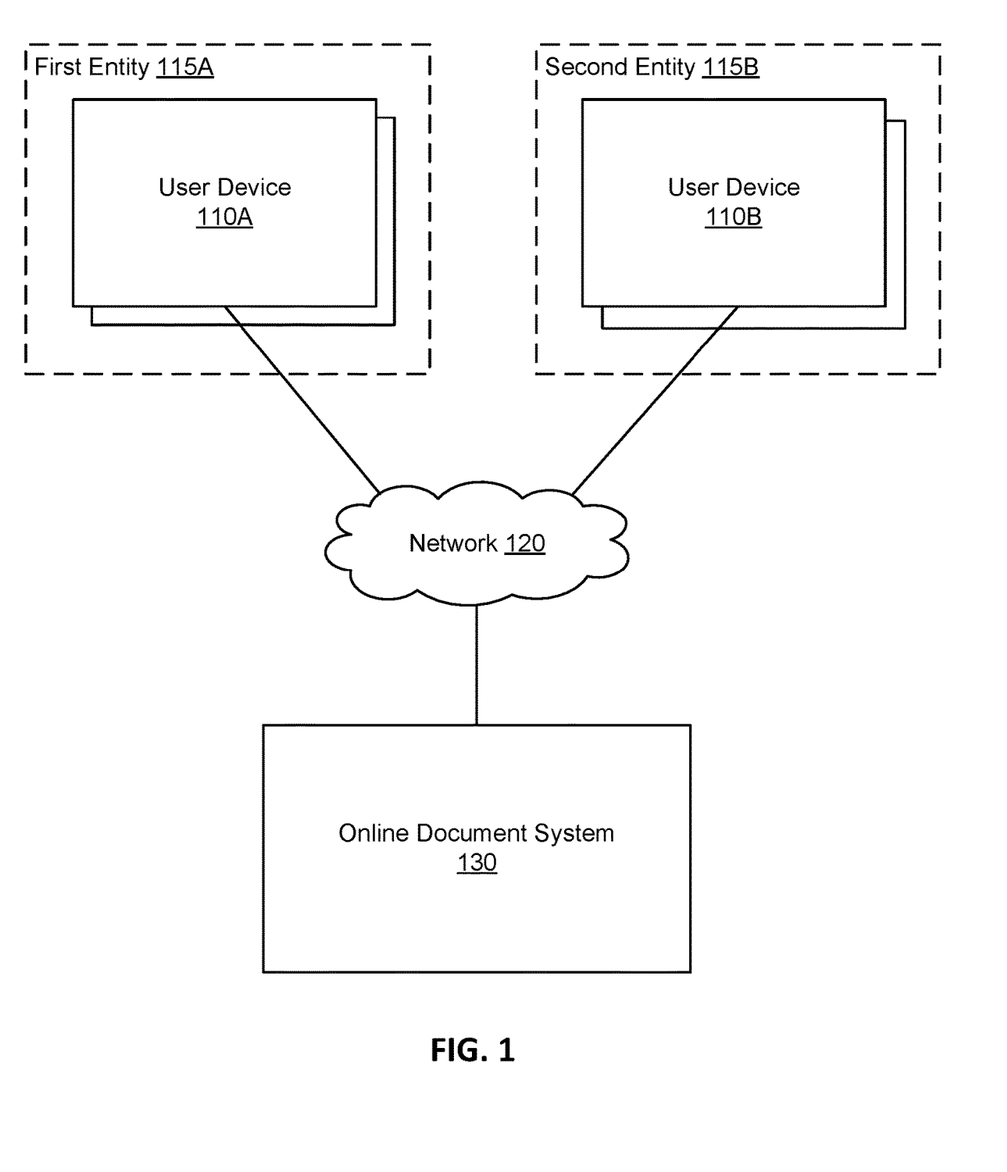
FIG. 1 is a high level block diagram of a system environment for an online document system, in accordance with an example embodiment.

FIG. 1 is a high level block diagram of a system environment for an online document system 130, in accordance with an example embodiment. The system environment illustrated in FIG. 1 includes the online document system 130, a network 120, and user devices 110 (e.g., user devices 110A and 11B). As illustrated in the example of FIG. 1, the individual user devices 110 are associated with entities 115, demonstrated by first entity 115A and second entity 115B. In some embodiments, the system environment includes components other than those described herein. For the purposes of concision, web servers, data centers, and other components associated with an online system environment are not shown in the example of FIG. 1.

The online document system 130 is a computer system (or group of computer systems) for storing and managing documents. Using the online document system 130, users can collaborate to create, edit, review, and negotiate documents. For example, the online document system 130 can enable the creation of a contract, agreement, press release, or other document arising from formal negotiation or collaboration between two or more entities 115. In some implementations, the online document system 130 allows negotiation on a per-clause bases, tracking proposed versions of individual clauses which can be separately (provisionally) agreed on before the document as a whole is agreed on by representative users from collaborating entities 115. The online document system 130 can be a server, server group, or cluster (including remote servers), or another suitable computing device or system of devices. In some implementations, the online document system 130 can communicate with user devices 110 over the network 120 to receive instructions and send documents (or other information) for viewing on the user devices 110. The online document system 130 can manage permissions associated with certain documents and with individual clauses within documents. Permissions to view and edit clauses in a document can be assigned to individual uses, groups of users, or entities 115. The online document system 130 can also provide user devices 110 with notifications when edits are made to certain clauses in a document and/or when permissions are updated.

The online document system 130 communicates with user devices 110 associated with user. A user can represent an individual, automated system, or group, able to interact with documents (or other content) generated on and/or managed by the online document system 130. Each user can be associated with a username, email address, or other identifier that can be used by the online document system 130 to identify the user and to control the ability of the user to view and modify documents managed by the online document system 130. In some implementations, users can interact with the online document system 130 through a user account with the online document system 130 and one or more user devices 110 accessible to that user. In the example of FIG. 1, the set of user devices 110 are represented by one or more user devices 110A associated with the first entity 115A and one or more user devices 110B associated with the second entity 115B.

A user device 110 may be any suitable computing device by which a user can communicate with the online document system 130. For example, a user device 110 can be a desktop or a laptop computer, a smartphone, tablet, or another suitable device. User devices 160 are configured to communicate via the network 120 (for example, with the online document system 130). In one embodiment, a user device 110 executes an application allowing a user of the user device 110 to interact with the online document system 130. For example, a user device 110 can execute a browser application to enable interaction between the user device 110 and the online document system 130 via the network 120. A single user can be associated with multiple user devices 110, in some embodiments. Similarly, one user device 110 can be shared between multiple users who may, for example, log into a personal account on the user device 110 to access the online document system 110, according to some embodiments.

An entity 115 is a business, organization, group, individual, or the like that is associated with a set of users and one or more documents in the online document system 130. For example, an entity 115 can be associated with an organization having an account with the online document system 130. A document can be associated with more than one entity 115 and can be edited, modified, and approved by users associated with entities 115. For example, documents negotiated between can be edited, modified, and approved by users from each negotiating entity 115 during the course of the negotiation. According to some embodiments, each entity can be associated with permissions definitions defining actions that users associated with that entity 115 can take with respect to specific clauses within documents. In some embodiments, the set of users associated with an entity 115 can interact documents associated with the entity 115, assign permissions to other users associated with the entity 115 or with another entity 115, and modify the entity's templates or workflows.

In the example of FIG. 1, the first entity 115A and the second entity 115B may be two organizations negotiating a contract document via the online document system 130. The users associated with each of the entities 115 can access the document under negotiation simultaneously and can make edits at the same time as well as view updates to the document from members of either entity 115 team in real time. Users associated with the first entity 115A can only view clauses of the document for which the first entity 115A has permission to access. Likewise, users associated with the second entity 115B can only view clauses f the document for which the second entity 115B has permission to access. In some embodiments, all participating entities have the ability to adjust clause permissions during document collaboration. For example, the negotiation team of the first entity 115A may want to perfect a proposed wording for a clause before suggesting the updated clause to the second entity 115B and may lock the clause so that users on the team of entity 115B cannot view the clause as it is changed in real time by the team members of the first entity 115A.

The network 120 transmits data within the system environment. The network 120 may be a local area or wide area network using wireless or wired communication systems, such as the Internet. In some embodiments, the network 120 transmits data over a single connection (e.g., a data component of a cellular signal, or Wi-Fi, among others), or over multiple connections. The network 120 may include encryption capabilities to ensure the security of customer data. For example, encryption technologies may include secure sockets layers (SSL), transport layer security (TSL), virtual private networks (VPNs), and Internet Protocol security (IPsec), among others.

Figure 2:
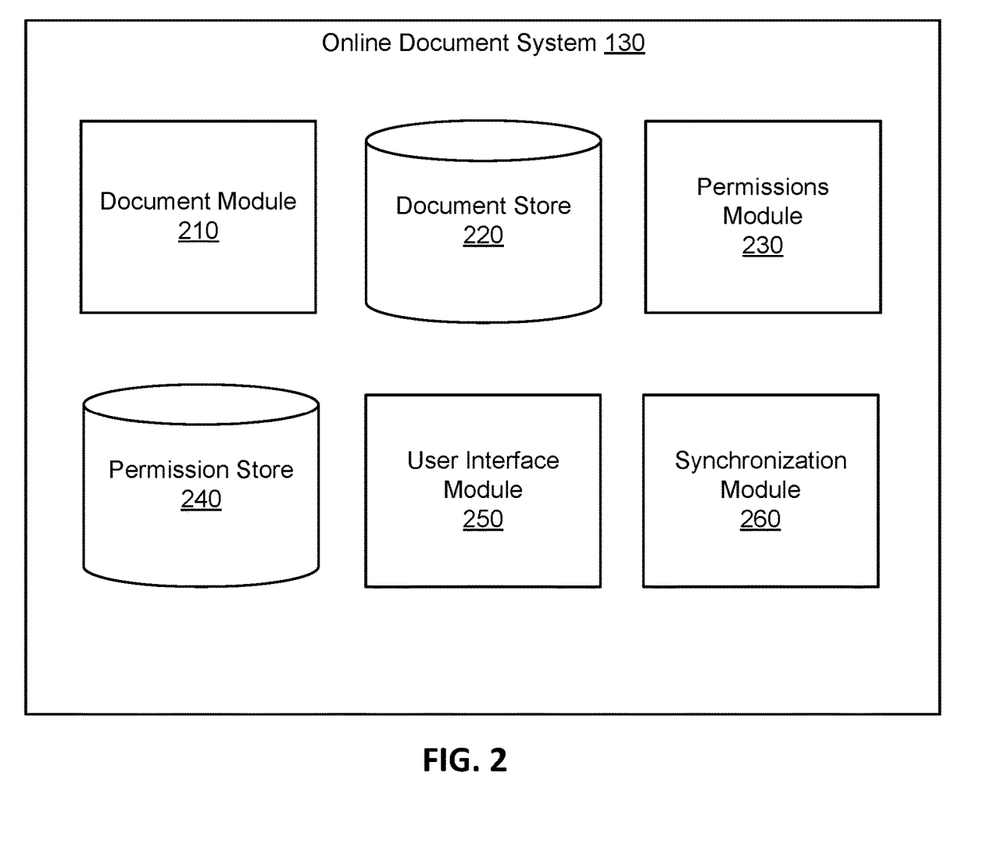
FIG. 2 is a high level block diagram of a system architecture of an online document system, in accordance with an example embodiment.

FIG. 2 is a high level block diagram of a system architecture of an online document system 130, in accordance with an example embodiment. The online document system 130 manages documents and enables user interactions with the documents. The online document system 130 also facilitates simultaneous editing and negotiation of a document by users associated with different entities and provides clause-level permissions settings so that certain clauses in a shared document can be edited by an entity without the other entity seeing the changes until they are ready for review. The document analysis system 130 includes a document module 210, a document store 220, a permissions module 230, a permission store 240, a user interface module 250, and a synchronization module 260. Computer components such as network interfaces, security functions, load balancers, failover servers, management and network operations consoles, and the like are not shown so as to not obscure relevant details of the system architecture. Additionally, the online documents system 130 may contain more, fewer, or different components than those shown in FIG. 2 and the functionality of the components as described herein may be distributed differently from the description herein.

The document module 210 can generate new documents, manage and update documents stored by the online document system 130, and maintain a record of edits (or other updates) to documents within the online document system 130. In some implementations, the document store 220 stores the documents, document versions, and other metadata related to the stored documents managed by the document module 210. Similarly, the document module 210 interacts with the user interface module 250, allowing users to provide new documents or modifications to existing documents and to view existing documents (including past versions of document and metadata about document), according to some embodiments. In some implementations, documents in the online document system 130 are divided into multiple clauses, each semi-independent of the other clauses in the document.

As used herein, a "clause" refers to a defined subset of a document (such as a section, paragraph, or contract clause) which can be independently managed by the document module 210. In some implementations, the document module 210 maintains an independent version history for each clause of the document in place of (or in addition to) an overall version history for the whole document. A document can be split into clauses at the time the document is created in or imported into the online document system 130. In some implementations, each clause is associated with a label or identifier and includes content for the clause (such as text, images, formatting, and the like), a position within the content of the document (used, for example, to display the clause in the correct position within the document and for generating a final document), a version history recording changes to the clause, a clause state (such as "agreed" or "unnegotiated"), a clause type, and/or a set of user permissions and/or entity permissions for the clause.

In some embodiments, clauses of a document can be assigned one or more clause types used to categorizing the clause within a document and between documents managed by the online document system 130. Clause types can broadly categorize clauses, allowing the online document system 130 to assign similar clauses of the same clause type the same rules (such as negotiation workflows and user permissions) without a user having to repetitively assign or update permissions, negotiation workflows, or other details. In some implementations, the online document system 130 can include clause types representing an area of relevance, such as legal, administrative, or finance clause types, can represent individual product or services (for example a series of clause types covering specific families of products or services associated with an entity 115), or can represent other information about the clause, such as a level of secrecy of the contained information (for example a "sensitive information" clause type). Clause types can also be used to represent a specific format or purpose of a clause, for example a "legal jurisdiction" clause type indicating a clause outlining what country or state laws a contract or agreement is being made under, or a "service description" clause type indicating a clause describing services to be provided or bought. In some embodiments, the online document system 130 uses logic rules based on clause types to assign viewing and editing permissions for clauses associated with one or more clause types.

In some embodiments, clauses are also associated with a "clause state" which, like a clause type, is an attribute of a clause. A clause state, as used herein, can represent the current state of the negotiations between entities 115 on that clause, for example, if the terms of the clause have been decided and agreed, if negotiation is in process on the clause (with not all parties satisfied), or if negotiation has not yet begun on a clause. In some embodiments, the online document system 130 determines clause state for a clause based on one or more clause types assigned by entities 115 and/or other attributes of the clause. For example, users associated with an entity 115 can sign off on a clause by assigning the clause an "accepted" clause type (specific to that entity 115) to clauses the entity 115 is satisfied with. If all entities 115 associated with a document are satisfied with a certain clause, the online document system 130 can calculate the clause state for that clause as "agreed." Similarly, if not all entities 115 are satisfied with the clause, the online document system 130 can assign a "not agreed" clause state. In some implementations, the online document system 130 can assign clause states based on other factors, for example the version history of a clause. A clause without all entities satisfied and no history of edits (determine through the version history) can be assigned an "unnegotiated" clause state indicating that the entities 115 have not begun negotiations on the clause. Similarly, a clause that all entities 115 accept and that has no history of edits can be assigned a "negotiation unneeded" clause state. In other embodiments, additional clause states can be determined based on additional clause types such as a "near agreed" clause type or other factors of the clause such as the length of time elapsed from the last edit to the clause.

As described above, the document module 210 can maintain a version history recording changes made to each clause of the negotiated document. For example, the document module 210 can store a version history of changes to a clause with the current version of that clause. A version history can include a record of previous changes to the clause (as well as previous versions of the clause), a time and/or date when each change was made, and an identifier of the user made each change. In some implementations, the version history stores proposed changes that have not yet been finalized, as well as an identifier of a user (or group of users) required to approve the change before it is incorporated into the current version of the clause. Similarly, the document module 210 can maintain internal versions of a clause for each entity 115 as well as an "official" version representing the current state of the negotiation visible to all entities 115. When changes are made to an internal (entity-specific) version of a clause the official version is not changed, allowing entities 115 to internally refine the document or clause without exposing working versions to other entities 115. In some embodiments, the version history of a clause additionally includes the entity permissions associated with a version of the clause. For example, if a first entity 115A has blocked the second entity 115B from viewing a clause while they make edits internally, the document module 210 can maintain a version of the clause with the associated permissions.

The method of dividing a document into clauses can depend on the structure and purpose of the document, for example a contract document can be split into clauses representing individual clauses or terms of the contract, while a joint press release might be split into clauses each covering different headings or topics covered in the document. In some implementations, clauses are contiguous portions of a document (for example, a paragraph or paragraphs, connected sentences, pages, or the like), although other implementations may also have non-contiguous clauses. For example, a contiguous clause may cover a "support level" term in a contract which outlines how much continuing support the seller of a product will provide with the product, while a similar non-contiguous clause may cover several "support level" terms for multiple products offered in the same contract.

The document store 220 is a file storage system, database, set of databases, or other data storage system storing documents, document clauses, version histories, and other information about documents managed by the online document system 130. The document store 220 can be a database implemented on a computing system local to the online document system 130, can be a remote or cloud-based database, or can be implemented using any other suitable hardware.

The permissions module 230 manages and enforces user and entity permissions for documents and clauses within the online document system 130. Documents, clauses, phrases, equations, notes, comments, and metadata within documents can each be associated with permissions controlling which actions users can take within the online document system 130. In some implementations, permissions managed by the permissions module 230 explicitly reference a specific user (for example, by name or user identifier), but permissions can also be assigned to users based on membership in an entity 115, group, or subgroup of users or based on a characteristic of the user. For example, users can be assigned additional permissions based on association with an entity 115 or based on membership in a subgroup of users (such as a legal team of the first entity 115A, or by being an internal user 132). When users from two or more entities 115 collaborate on a document simultaneously, they can set specific permissions for individual clauses that affect whether real-time changes to a specific clause can be viewed by the other entities. This sort of permission adjustment for simultaneously editing a document can also be applied to comments on a draft document or other metadata associated with the document. Thus, portions of a shared editing document can be obscured from certain entities 115 while they are being edited by other entities 115 in the collaboration.

The permissions module 230 assigns permissions to view, edit, approve edits to, or otherwise modify a clause within a document. In some implementations, editing permissions include "full edit" permissions granting a user the ability to make and save changes to the content of the clause, "approved edit" permissions allowing a user to make edits which are not incorporated into the clause until another user approves the proposed changes (for example, a user with "approval" permissions for the edited clause), and a "pre-approved edit" permission which allows a user to switch a clause between prewritten stock forms of a clause (for example, choosing from a selection or menu of pre-approved options for the clause). Similarly, the permissions module 230 can assign other permissions, such as a "view only" permission (which allows a user to view but not edit the clause) or a "locked" permission (which prevents a user from viewing or editing the clause).

In some implementations, the permissions module 230 also includes permissions which allow users to modify the permissions granted to other users. For example, administrator permissions or "locking" permissions allowing a user to prevent other users from editing the clause (by assigning them the "locked permission, in some embodiments). Similarly, permission definitions can grant users permissions to manage a negotiation between entities, such as permissions to officially proposing a change to a document or clause (resulting in the changes being visible to other entities), permissions to view proposed changes, and permissions to accept proposed changes. Similarly, the permissions module 230 can grant permissions allowing a user to change the clause state of a clause to represent the state of negotiation on behalf of an entity 115. For example, a user can change a clause state to "approved" to indicate that the entity 115 approves of a clause in its current state. Other implementations of the permissions module 230 can include more or different permissions assignable to users.

The permission store 240 is a file storage system, database, set of databases, or other data storage system storing permissions associated with documents, document clauses, version histories, and other information about documents managed by the online document system 130. The permission store 240 can be a database implemented on a computing system local to the online document system 130, can be a remote or cloud-based database, or can be implemented using any other suitable hardware. The permission store 240 may be updated and accessed frequently during a shared document editing session as multiple entities update the permissions associated with whether another entity can view a clause that is currently under edit in the shared document.

The user interface module 250 generates user interfaces allowing users to interact with documents managed by the online document system 130, according to some embodiments. For example, the user interface module 250 can receive user instructions from a web-based application with integrated document content editing interacted with by a user. In some implementations, the user interface module 250 can provide a user interface enabling users to add, delete, or modify the contents of a negotiated document or documents clause based on one or more permission definitions. A user interface provided by the user interface module 250 can allow users to modify content such as text, images, links to outside sources of information such as databases, and the like. In the embodiments described herein, the user interface provides interfaces for multiple users who may be associated with different entities 115 to access, view, and edit the same document simultaneously. The user interface module 250 accessing information from the permission store 240 and the synchronization module 260 to determine which clauses in the document should be obscured from view for users associated with specific collaborating entities during the shared editing session. The user interface module 250 can also provide a user interface for authorized users to view or modify permissions definitions granting permissions to other users. In some implementations, the user interface module 250 provides tools for participating in a negotiation between entities 115, for example, by allowing authorized users to change permissions of other users with respect to specific clauses, view version histories of clauses, change or advance a negotiation workflow, invite external users to participate in the negotiation, agree on or finalize clauses, or view a visualization of the current state of the negotiation (for example, a visualization of agreed on clauses and/or the changes to a negotiated document).

The synchronization module 260 facilitates simultaneous viewing and editing of a document by a plurality of users associated with various entities involved in a document collaboration. When one user makes an edit to the document, the synchronization module 260 identifies the change and updates the interface of the other collaborating users to show the change. To manage these real-time updates, the synchronization module 260 may interface with the permissions module, the document module 210, and the user interface module 250 to update a current state of the document stored in the document store 220, and to determine the permissions for which of the collaborating users are currently permitted to view the change. For example, if a clause is currently locked by the first entity 115A, all users associated with the first entity 115A may be able to view and participate in edits made to the clause in the shared document in real-time, but the users associated with the second entity 115B, may not be able to see any changes. In one embodiment, obscuring the changes from another entity 115 may mean that the entity sees only the most recent open version of the clause, or may mean that the blocked entity 115 sees a blurred out or otherwise obscured clause section. The synchronization module 260 also monitors and detects when changes are made to permissions for a clause within the shared document. When the permissions are updated for a clause, the synchronization module 260 interfaces with the permissions module 230 to update the permissions data in the permission store 240 and interacts with the user interface module 250 to update the views of each of the collaborating users according to the new permissions. For example, when users of the first entity 115A have worked together to simultaneously edit a clause which had been closed to the second entity 115B, the first entity 115A may update the permissions of the clause so that the users of entity 115B can again access, view, and suggest edits to the clause in the shared document.

Example Simultaneous Editing Interfaces

Figure 3A:
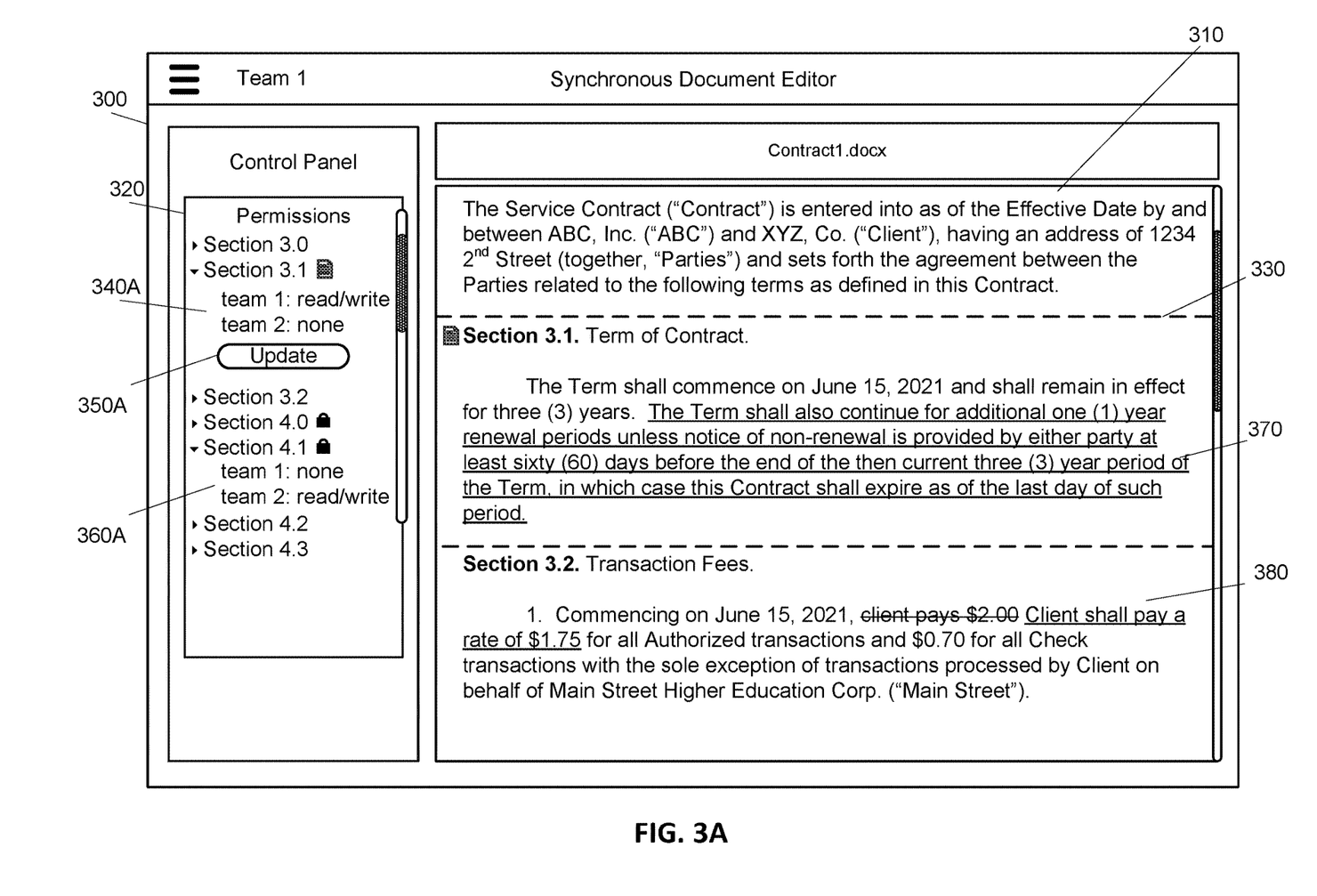
FIG. 3A illustrates an example user interface for a user associated with a first entity while collaborating on a shared document with a user associated with a second entity.

As described above, the user interface module 250 presents a user interface to users allowing multiple users to interact with the online document system 130 and to make edits to the document simultaneously (for example, to create, view, negotiate, and/or modify documents). FIG. 3A illustrates an example user interface for a user associated with the first entity 115A while collaborating on a shared document with a user associated with the second entity 115B. The example interface 300 of FIG. 3A includes a document viewing area 310, and a permissions control panel 320.

The document viewing area 310 allows the user to view the current state of the document. In some cases, the document viewing area 310 may also be used to view prior versions of a document or prior versions of a clause. When a collaborating user from either entity makes an edit to the document, the change appears in the document viewing area 310. For example, as shown with by the document markup 380 which indicates that information has been edited in the shared document by one of the collaborating users. The document viewing area 310 includes clause areas such as the clause are 330 which is demonstrated in the example by dotted lines representing the boundaries of clause "Section 3.1". In the example of FIG. 3A, the clause area represents a clause in the document for which permissions can be adjusted separately from other clauses in the document.

In the example of FIG. 3A, the permissions control panel 320 provides an interface for the user to view and adjust current permissions to clauses in the shared document. For example, a clause permission status 340A for Section 3.1 shows that "Team 1" (i.e., the first entity 115A) currently locked Section 3.1 so that "Team 2" (i.e., the second entity 115B) has no read/write permissions for the clause and thus cannot view the edits that Team 1 is making in real time to the clause. Since FIG. 3A is an interface for viewing by a member of the first entity 115A, the interface presents the clause 370 and the edits being made by members of the first entity 115A as demonstrated by the markup on the clause 370. The permissions control panel 320 includes an update widget 350A that a user associated with the first entity 115A can select to change the permissions associated with the different entities for the clause. The permission control panel 320 in the example of FIG. 3A also shows an expanded view of the permission status 360A for another clause "Section 4.1." For Section 4.1, the users associated with the first entity 115A currently have no read/write permissions. Since Team 2 is working on Section 4.1 and initiated the lock on the section, no update widget is available on the user interface of users of Team 1 to change the permissions for the clause.

Figure 3B:
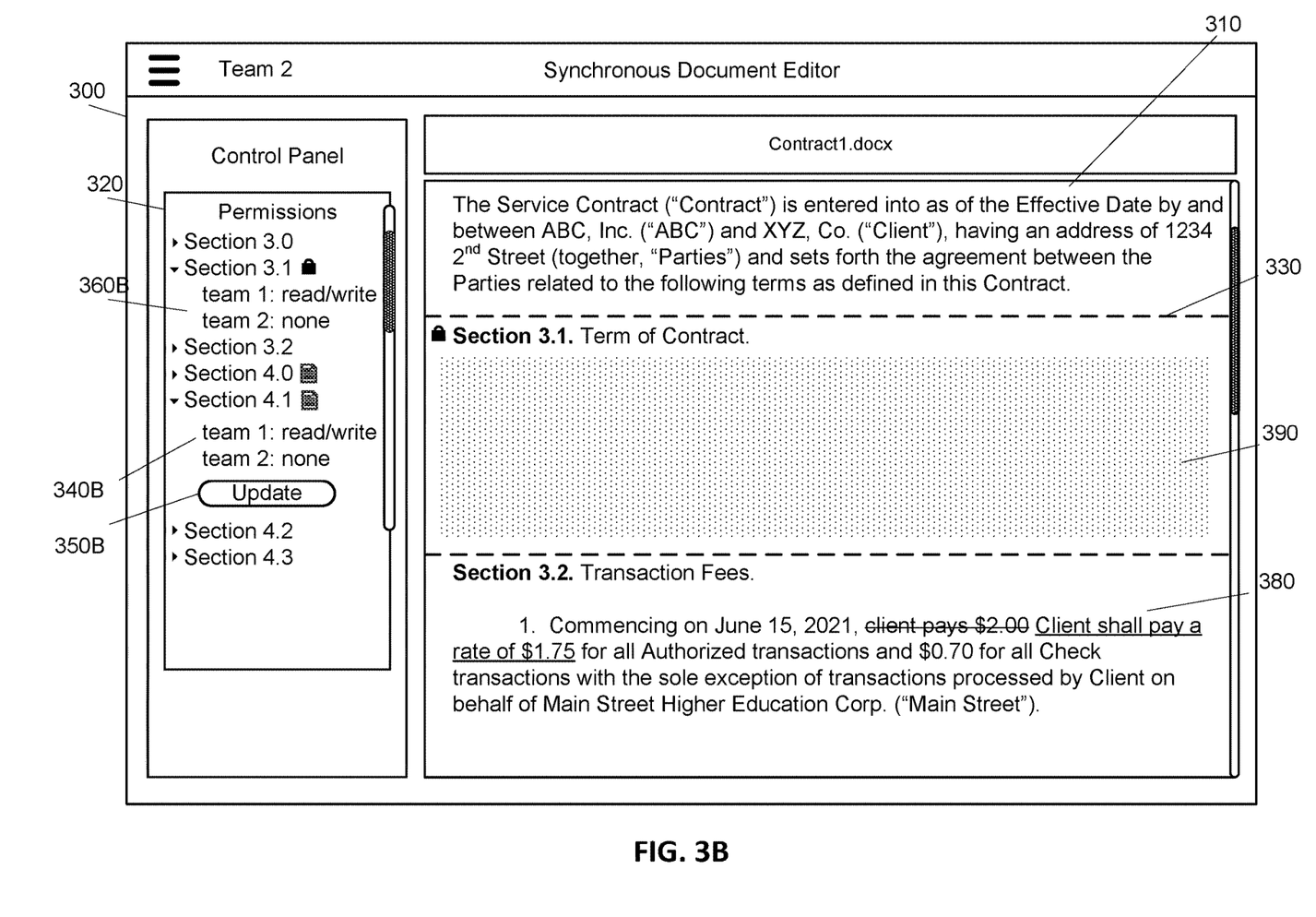
FIG. 3B illustrates an example user interface for a user associated with a second entity while collaborating on the shared document with a user associated with a first entity.

FIG. 3B illustrates an example user interface for a user associated with the second entity 115B while collaborating on the shared document with a user associated with the first entity 115A. Note that the example user interfaces of FIG. 3A and FIG. 3B are from the same moment in time on different user devices 110 associated with different entities 115. The example interface 300 of FIG. 3B includes a document viewing area 310 and a permissions control panel 320. Since Team 1 has locked the Section 3.1 clause while they perform private edits, the clause area 330 for Section 3.1 includes an obscured clause 390. That is, users associated with the second entity 115B cannot view the clause or changes being made to the clause in by the users associated with the first entity 115A, although everyone can continue to edit and view unlocked sections of the document in real time. Since Team 1 initiated the lock on Section 3.1, a permission status 360B for Section 3.1 does not include an update widget for the user of Team 2. However, the permission status 340B does include an update widget 350B which the user associated with the second entity 115B can use to adjust permissions for clause Section 4.1.

The example of FIG. 3A and FIG. 3B demonstrates the first entity 115A locking the second entity 115B out of a clause so that the clause cannot be viewed at all by the second entity 115B. However, in various embodiments, different user interfaces may be used when an entity is privately editing a clause. For example, the locked-out entity 115 could be able to view the most recently public version of the clause (with an indication that it is being edited by another entity offline). In another embodiment, multiple entities may be able to make lock a clause at once and when they check their edits to the clause back into the document, the document module performs a check-in procedure wherein the various entities 115 may accept or reject merged changes.

Figure 4:
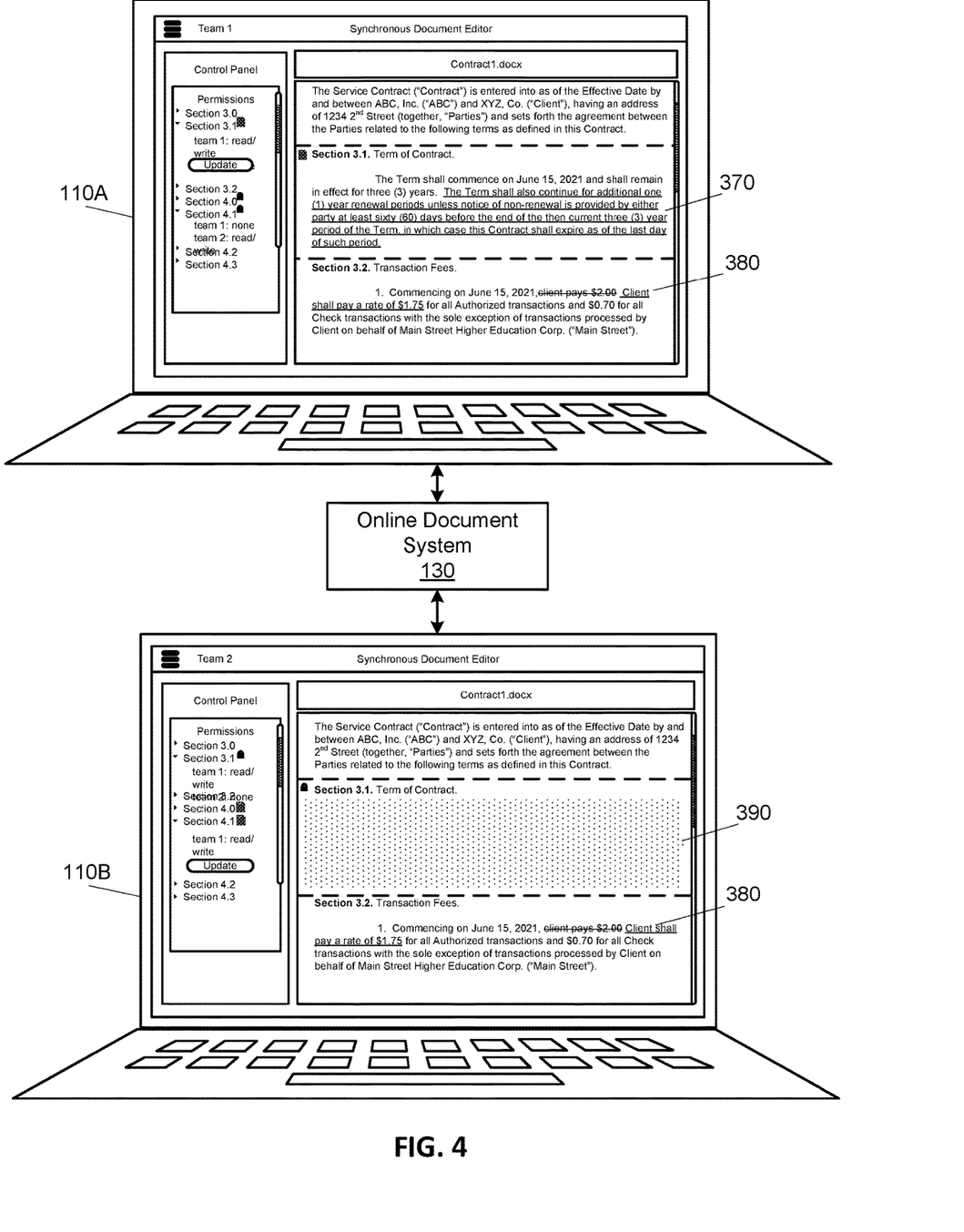
FIG. 4 illustrates two user devices collaborating simultaneously on a document, in accordance with an example embodiment.

FIG. 4 illustrates two user devices collaborating simultaneously on a document, in accordance with an example embodiment. The synchronization module 260 of the online document system 130 enables real-time collaboration such that users can make edits to the document simultaneously and can view the changes made by other collaborators in real-time. FIG. 4 shows a user device 110A associated with the first entity 115A and a user device 110B associated with the second entity 115B. The user interface of the first user device 115A shows the clause 370 that is being edited by the first entity 115A. The user device 110A can view the edits being made to the clause 370 in real time because it is viewable by the first entity 115A. Conversely, the clause 370 is not currently viewable on the second user device 110B because it is associated with the second entity 115B, which is currently locked out of viewing the clause 370 while users associated with the first entity 115A make edits and confer among themselves. Instead, the user interface of the second user device 110B obscures 390 the section of the locked clause. Since the clause of Section 3.2 is not currently locked to either entity, both the interface of user device 110A and the interface of user device 110B show document markup 380 as changes are made by either entity in that clause in real time.

Simultaneous Editing Process

Figure 5:
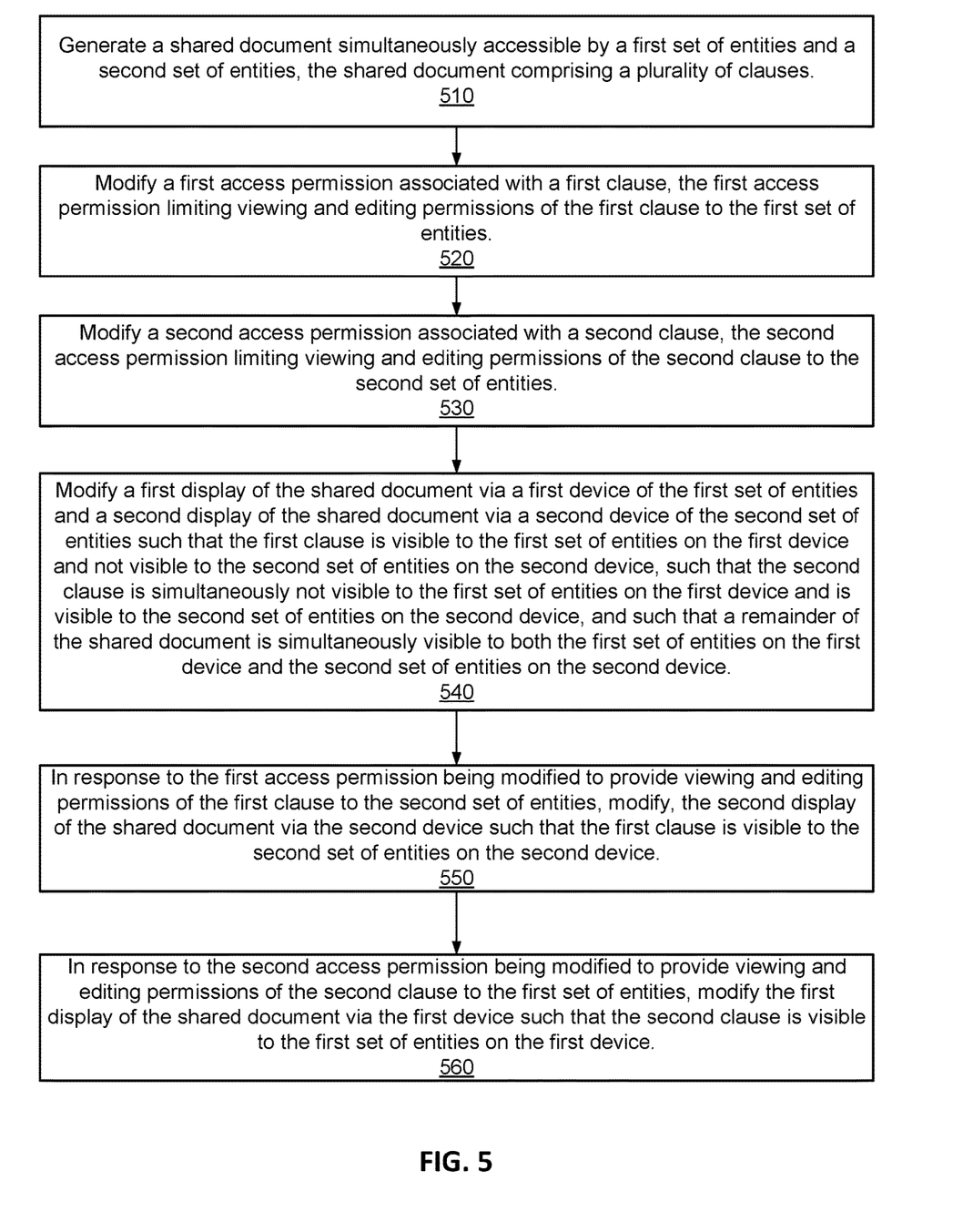
FIG. 5 is a flowchart illustrating a process for collaborating on a shared document in real time using an online document system, in accordance with an example embodiment.

FIG. 5 is a flowchart illustrating a process for collaborating on a shared document in real time using an online document system, in accordance with an example embodiment. The process begins when a shared document is generated 510 by the online document system 130 based, for example, on a request from a creating user. The shared document includes a plurality of clauses and is simultaneously accessible by a first set of entities and a second set of entities. The online document system modifies 520 a first access permission associated with a first clause in the shared document. The first access permission limits viewing and editing permissions of the first clause to the first set of entities. The online document system modifies 530 a second access permission associated with a second clause of the shared document. The second access permission limits viewing and editing permissions of the second clause to the second set of entities.

The online document system 130 modifies 540 a first display of the shared document via a first device of the set of entities 115 (e.g., user device 110A) and also modifies a second display of the shared document via a second device (e.g., user device 110B) of the second set of entities 115. The modifications are made such that the first clause is visible to users of devices 110A associated with the first set of entities 115A and not visible to users of devices 110B associated with the second set of entities 115B. Simultaneously, the modifications are made such that the second clause is not visible to users of devices 110A associated with the first set of entities 115A and is visible to users of devices 110B associated with the second set of entities 115B. The remainder of the shared document is simultaneously visible to both the first set of entities 115A and the second set of entities 115B on both the first devices 110A and the second devices 110B.

In response to the first access permission being modified to provide viewing and editing permissions of the first clause to the second set of entities, the online document system 130 modifies 550 the second display of the shared document via the second device such that the first clause is visible to the second set of entities on the second device. In response to the second access permission being modified to provide viewing and editing permissions of the second clause to the first set of entities, the online document system 130 modifies 560 the first display o the shared document via the first device such that the second clause is visible to the first set of entities on the first device.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
generating, by a document management system, a shared document simultaneously accessible by a first set of entities and a second set of entities, the shared document comprising a plurality of clauses;
modifying, by the document management system, a first access permission associated with a first clause of the plurality of clauses, the first access permission limiting viewing and editing permissions of the first clause to the first set of entities and not the second set of entities;
modifying, by the document management system, a second access permission associated with a second clause of the plurality of clauses, the second access permission limiting viewing and editing permissions of the second clause to the second set of entities and not the first set of entities;
modifying, by the document management system and based at least in part on the first access permission and the second access permission, a first display of the shared document via a first device of the first set of entities and a second display of the shared document via a second device of the second set of entities such that the first clause is visible to the first set of entities on the first device and not visible to the second set of entities on the second device, such that the second clause is simultaneously not visible to the first set of entities on the first device and is visible to the second set of entities on the second device, and such that a remainder of the shared document is simultaneously visible to both the first set of entities on the first device and the second set of entities on the second device;
in response to the first access permission being modified to provide viewing and editing permissions of the first clause to the second set of entities, modifying, by the document management system, the second display of the shared document via the second device such that the first clause is visible to the second set of entities on the second device; and
in response to the second access permission being modified to provide viewing and editing permissions of the second clause to the first set of entities, modifying, by the document management system, the first display of the shared document via the first device such that the second clause is visible to the first set of entities on the first device.

2. The method of claim 1, further comprising:
while the first access permission limits viewing and editing permissions of the first clause to the first set of entities:
receiving, by the document management system, edits to a portion of the first clause from the first device of the first set of entities; and
modifying, by the document management system, the first display of the shared document such that the edits to the first clause are visible to the first set of entities on the first device and not visible to the second set of entities on the second device.

3. The method of claim 1, wherein a first clause includes one of: a document section, a phrase in the document, a word in the document, a sentence in the document, an equation in the document, a comment associated with the document, and metadata associated with the document.

4. The method of claim 1, wherein the document management system saves versions of the first clause and the access permissions associated with each of the versions of the first clause.

5. The method of claim 1, wherein each clause in the shared document can be independently approved or rejected by the first entity and the second entity.

6. The method of claim 1, further comprising:
in response to the first access permission being modified, transmitting, by the document management system, a notification about the modification to second set of entities.

7. The method of claim 1, wherein edits made to the shared document appear in the displays to both the first set of entities and the second set of entities as tracked changes.

8. A computer system comprising:
one or more processors for executing computer program instructions; and
a non-transitory computer-readable storage media comprising stored instructions executable by the one or more processors, the instructions when executed causing the one or more processors to:
generate a shared document simultaneously accessible by a first set of entities and a second set of entities, the shared document comprising a plurality of clauses;
modify a first access permission associated with a first clause of the plurality of clauses, the first access permission limiting viewing and editing permissions of the first clause to the first set of entities and not the second set of entities;
modify a second access permission associated with a second clause, the second access permission limiting viewing and editing permissions of the second clause to the second set of entities and not the first set of entities;
modify, based at least in part on the first access permission and the second access permission, a first display of the shared document via a first device of the first set of entities and a second display of the shared document via a second device of the second set of entities such that the first clause is visible to the first set of entities on the first device and not visible to the second set of entities on the second device, such that the second clause is simultaneously not visible to the first set of entities on the first device and is visible to the second set of entities on the second device, and such that a remainder of the shared document is simultaneously visible to both the first set of entities on the first device and the second set of entities on the second device;
in response to the first access permission being modified to provide viewing and editing permissions of the first clause to the second set of entities, modify the second display of the shared document via the second device such that the first clause is visible to the second set of entities on the second device; and
in response to the second access permission being modified to provide viewing and editing permissions of the second clause to the first set of entities, modify the first display of the shared document via the first device such that the second clause is visible to the first set of entities on the first device.

9. The computer system of claim 8, the instructions, when executed, further causing the one or more processors to:

while the first access permission limits viewing and editing permissions of the first clause to the first set of entities:
receive edits to a portion of the first clause from the first device of the first set of entities; and
modify the first display of the shared document such that the edits to the first clause are visible to the first set of entities on the first device and not visible to the second set of entities on the second device.

10. The computer system of claim 8, wherein a first clause includes one of: a document section, a phrase in the document, a word in the document, a sentence in the document, an equation in the document, a comment associated with the document, and metadata associated with the document.

11. The computer system of claim 8, wherein the document management system saves versions of the first clause and the access permissions associated with each of the versions of the first clause.

12. The computer system of claim 8, wherein each clause in the shared document can be independently approved or rejected by the first entity and the second entity.

13. The computer system of claim 8, the instructions, when executed, further causing the one or more processors to:
in response to the first access permission being modified, transmit a notification about the modification to second set of entities.

14. The computer system of claim 8, wherein edits made to the shared document appear in the displays to both the first set of entities and the second set of entities as tracked changes.

15. A non-transitory computer-readable storage media comprising stored instructions executable by one or more processors, the instructions when executed causing the processor one or more processors to:
generate a shared document simultaneously accessible by a first set of entities and a second set of entities, the shared document comprising a plurality of clauses;
modify a first access permission associated with a first clause of the plurality of clauses, the first access permission limiting viewing and editing permissions of the first clause to the first set of entities and not the second set of entities;
modify a second access permission associated with a second clause of the plurality of clauses, the second access permission limiting viewing and editing permissions of the second clause to the second set of entities and not the first set of entities;
modify, based at least in part on the first access permission and the second access permission, a first display of the shared document via a first device of the first set of entities and a second display of the shared document via a second device of the second set of entities such that the first clause is visible to the first set of entities on the first device and not visible to the second set of entities on the second device, such that the second clause is simultaneously not visible to the first set of entities on the first device and is visible to the second set of entities on the second device, and such that a remainder of the shared document is simultaneously visible to both the first set of entities on the first device and the second set of entities on the second device;
in response to the first access permission being modified to provide viewing and editing permissions of the first clause to the second set of entities, modify the second display of the shared document via the second device such that the first clause is visible to the second set of entities on the second device; and
in response to the second access permission being modified to provide viewing and editing permissions of the second clause to the first set of entities, modify the first display of the shared document via the first device such that the second clause is visible to the first set of entities on the first device.

16. The non-transitory computer-readable storage media of claim 15, the instructions, when executed, further causing the one or more processors to:
while the first access permission limits viewing and editing permissions of the first clause to the first set of entities:
receive edits to a portion of the first clause from the first device of the first set of entities; and
modify the first display of the shared document such that the edits to the first clause are visible to the first set of entities on the first device and not visible to the second set of entities on the second device.

17. The non-transitory computer-readable storage media of claim 15, wherein a first clause includes one of: a document section, a phrase in the document, a word in the document, a sentence in the document, an equation in the document, a comment associated with the document, and metadata associated with the document.

18. The non-transitory computer-readable storage media of claim 15, wherein the document management system saves versions of the first clause and the access permissions associated with each of the versions of the first clause.

19. The non-transitory computer-readable storage media of claim 15, wherein each clause in the shared document can be independently approved or rejected by the first entity and the second entity.

20. The non-transitory computer-readable storage media of claim 15, the instructions, when executed, further causing the one or more processors to:
in response to the first access permission being modified, transmit a notification about the modification to second set of entities.

\* \* \* \* \*